Dec. 30, 1952 W. B. WIER 2,623,450
BREWING APPARATUS
Filed Nov. 25, 1949 3 Sheets-Sheet 2
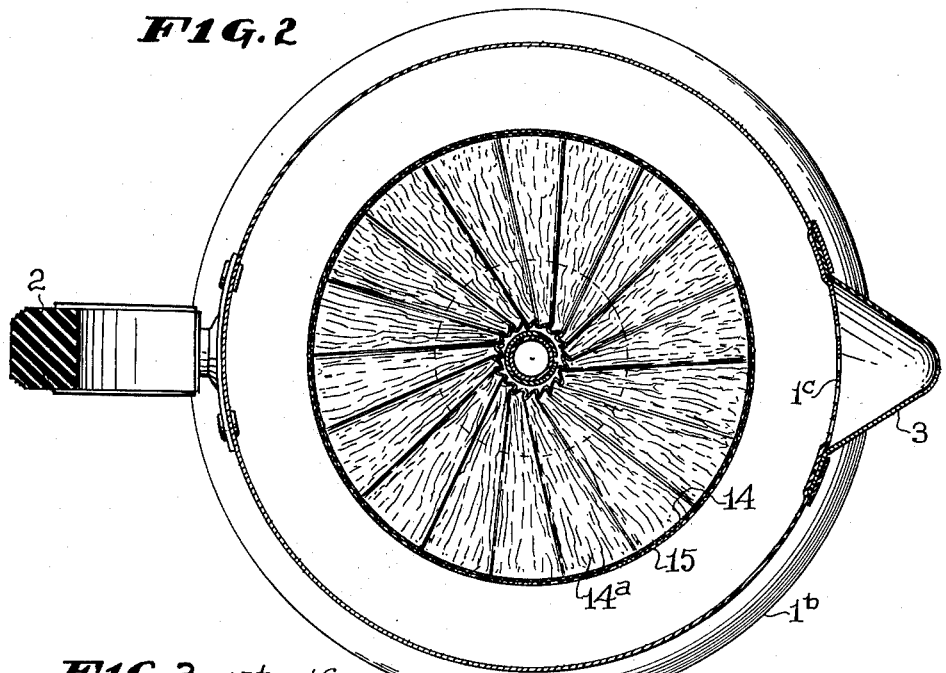
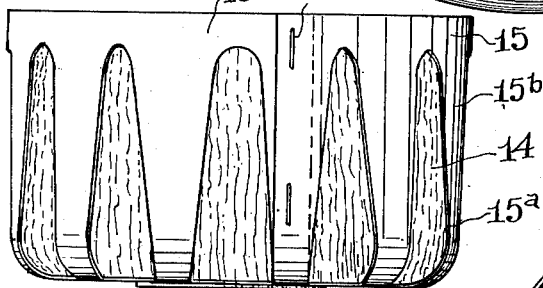
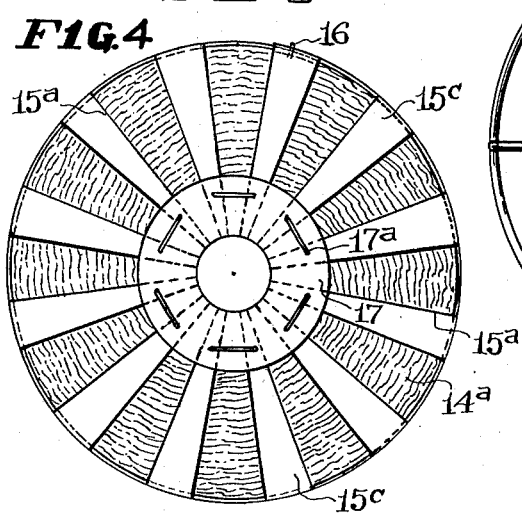
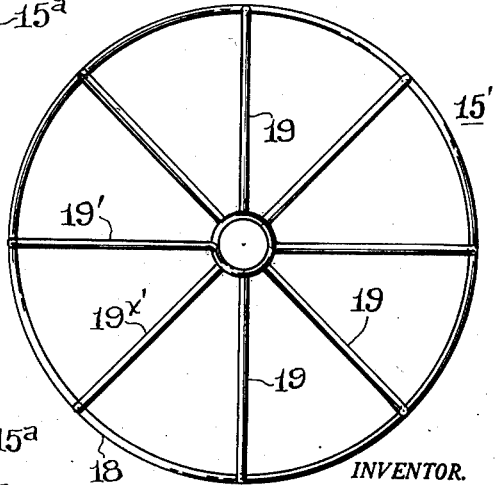
INVENTOR.
WILLIAM B. WIER.
BY
Geo. B. Pitt
ATTORNEY Dec. 30, 1952　　　　　W. B. WIER　　　　　2,623,450
BREWING APPARATUS
Filed Nov. 25, 1949　　　　　　　　　　　3 Sheets-Sheet 3
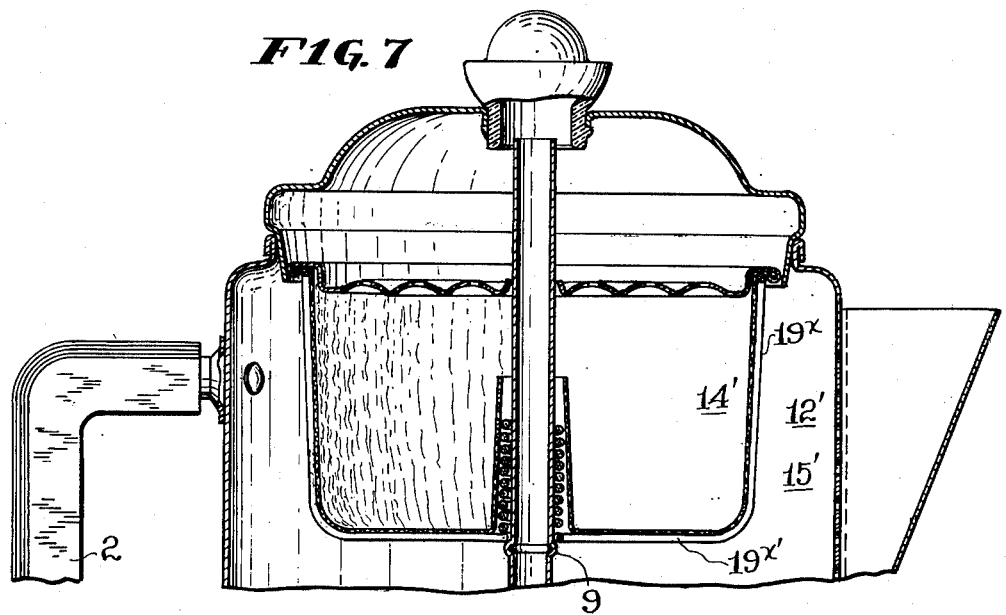
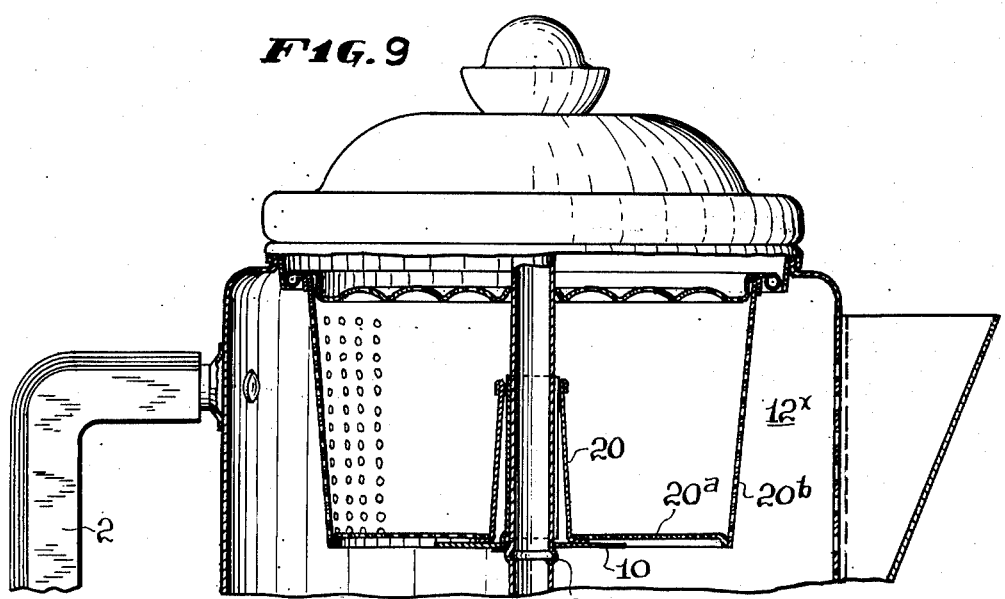
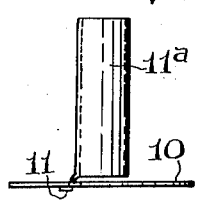
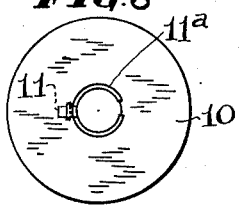
INVENTOR.
WILLIAM B. WIER
BY Geo. B. Pitts
ATTORNEY.

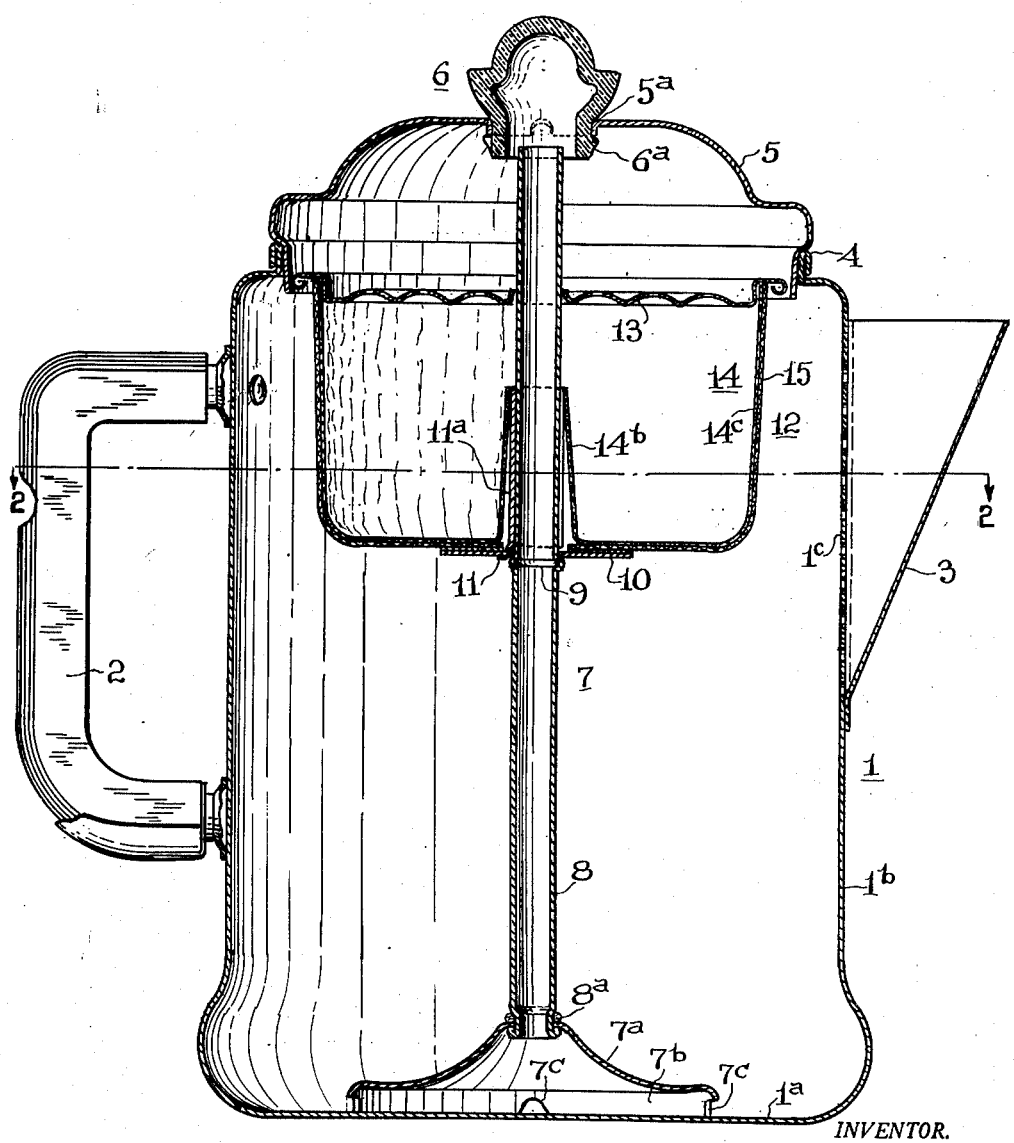

Patented Dec. 30, 1952

2,623,450

UNITED STATES PATENT OFFICE 2,623,450

BREWING APPARATUS

William B. Wier, Cleveland Heights, Ohio

Application November 25, 1949, Serial No. 129,229

3 Claims. (Cl. 99—310)

This invention relates to a portable apparatus for brewing beverages, more particularly an apparatus of the type wherein brewing is effected by heating a liquid and causing circulation thereof to and through a body of flavoring substance in a holder, the latter having perforated or porous bottom and side walls through which the circulated and recirculated liquid passes, whereby infusion of the soluble portions of the substance with the heated liquid is effected. In all apparatus of this type, of which I have knowledge, the apparatus has consisted of a container enclosing various parts, one of which was a metallic cup shaped holder having perforated bottom and side walls, adapted to hold a quantity of the substance or substances to be brewed. In each operation of brewing a beverage, such as coffee, in apparatus of the type referred to, a residue is left in the holder, which has to be emptied and washed and the residue disposed of. These operations have been found to involve many objections, such as spilling of the residue, which always contains soluble materials and grounds saturated with liquid, and undue labor and extra washing compound are usually involved in washing the holder, to avoid the taste of subsequently brewed coffee being affected.

The invention includes a holder for the flavoring or brewing substance formed of cellulose material and of economical cost, so that when once used it may be discarded; that is, at the end of the brewing operation the holder and residue therein may be disposed of in any appropriate manner, whereby the objections, such as those above referred to, are totally eliminated. The invention also includes a holder for the flavoring or brewing substance formed of cellulose material shaped to fit within and co-operatively associated with other parts of the apparatus and readily assembled with and disassembled from said parts, so that at the end of the brewing operation the holder with the residue therein may be thrown away or destroyed and a new holder employed for the succeeding brewing operation. Thus, it follows that separate disposal of the residue from the holder is eliminated, the labor required to recondition the apparatus for re-use is reduced and all danger of the taste of subsequently brewed beverage being affected is avoided.

One object of the invention is to provide an improved brewing apparatus having a removable holder for the brewing substance which holder and substance, following each brewing operation, may be discarded and replaced by a new holder, whereby washing or reconditioning of each holder is eliminated.

Another object of the invention is to provide in a brewing apparatus, an improved holder for a substance or substances to be brewed, of simple and economical construction, whereby a holder may be used once and discarded to save time and labor.

Another object of the invention is to provide in a brewing apparatus an improved holder formed of cellulose material and adapted to hold a quantity of the substance during brewing thereof and having a porous wall to permit seepage of the liquid therethrough.

Another object of the invention is to provide, in a brewing apparatus, a discardable holder for the flavoring material having perforated or porous walls for passage of the liquid therethrough and shaped to removably fit within standard types of brewing apparatus, whereby the disposal of the residue following each operation is facilitated and the reconditioning of the apparatus is simplified.

A further object of the invention is to provide, in a brewing apparatus, a discardable holder for the flavoring material formed of fragile material and provided with ports or openings for the passage of the circulated liquid therethrough and having a member engaging the holder to reinforce it while in use against distortion, said holder with the residue being adapted to be removed, and discarded, whereby the disposal of the residue following a brewing operation is facilitated and the reconditioning of the apparatus is eliminated.

Other objects of the invention will be apparent to those skilled in the art to which my invention relates from the following description taken in connection with the accompanying drawings, wherein Fig. 1 is a vertical sectional view of a brewing apparatus embodying my invention;

Fig. 2 is a section on the line 2—2 of Fig. 1;

Fig. 3 is a side elevation of the holder;

Fig. 4 is a bottom plan view of the holder;

Figs. 5 and 6 are elevational and plan views, respectively, of the support for the holder;

Fig. 7 is a fragmentary sectional view showing a different form of construction;

Fig. 8 is a bottom plan view of the outer holder member shown in Fig. 7;

Fig. 9 is a fragmentary sectional view of another form of holder.

In the drawings (referring particularly to Figs. 1 to 6, inclusive), I indicates as an entirety, a receptacle or pot for liquid for use in carrying out brewing operations, as later set forth. In the application of the present invention I have brewed coffee; however, it is to be understood that reference herein to the use of the apparatus for brewing coffee is not for the purpose of limiting the invention to such kind of beverage. The pot 1 consists of a bottom 1a, a circular side wall 1b of conventional shape provided at one side with a suitable handle 2 and diametrically of the handle the upper portion 1c of the side wall 1b is perforated with which is associated a pouring spout 3. The upper end portion of the side wall 1b is preferably reduced circumferentially and forms a seat 4 for a suitable inverted concave-convexed shaped cover 5, which in turn is formed with an opening 5a disposed axially of the pot 1. 6 indicates a transparent hollow closure having a neck 6a detachably fitting and extending through the opening 5a. The marginal edge of the opening 5a and exterior side of the neck 6a may be provided with engageable elements, preferably of the bayonet joint type, to insure their detachably connected relation when the pot is in use. 7 indicates as an entirety the lqiuid circulating devices consisting of the following: 7a indicates an inverted bell-like member removably supported on the bottom 1a. The annular rim 7b of the member 7a is provided with a plurality of inwardly extending recesses 7c to permit of the inflow of water in a well known manner. 8 indicates a riser suitably connected at its lower end to the marginal edge of an opening 8a formed axially in the bell-like member 7a. The member 7a and riser 8 are preferably rigidly connected to permit handling thereof as a unit. The riser 8 extends upwardly and terminates at its upper end within the neck 6a of the closure 6. The neck 6a is somewhat larger in diameter than that of the riser, so that the heated water and bubbles circulating through the riser and discharged into the closure 6, incident to a brewing operation, may gravitate downwardly. Intermediate its ends the riser is provided with an annular shoulder 9 which is engaged by the inner peripheral edge of an annular support 10. The shoulder 9 is preferably provided by embossing the wall of the riser 8 outwardly circumferentially. The support 10 is formed with an opening through which an angularly shaped lug 11 on the lower end of a vertically disposed sleeve 11a extends, the end portion of the lug being suitably secured rigidly to the lower side of the support 10. The sleeve 11a is disposed axially of the opening in the support 10 so as to slidably engage the riser 8. The sleeve 11a, diametrically of the lug 11, is spilt so that its side portions may expand to fit risers 8 the outer diameters of which may vary.

12 indicates as an entirety a holder for a substance, such as ground coffee, to be brewed. As shown in Fig. 1, the holder 12 is removably supported on the support 10. Figs. 1 to 4, inclusive, illustrate one form of holder 12 of annular shape, the upper end of the outer side wall of the holder forming a support for a removable perforated liquid spreader 13 of conventional construction; however, it will be understood that the invention is not to be limited to this disclosed arrangement, wherein the holder supports the liquid spreader 13, as the latter may be otherwise supported in superimposed relation to the holder 12. The holder 12 consists of inner and outer members 14, 15, both formed of cellulose materials. The inner member 14 is formed of porous paper and shaped to provide a bottom wall 14a, an inner side wall 14b and an outer side wall 14c, the porosity of these walls permitting the liquid, supplied to and discharged by the spreader 13 for seepage through the brewing substance in the holder, to readily gravitationally flow through the pores of the paper, whereas the outer member 15 is formed of thin paper stock shaped to engage the bottom wall 14a and outer side wall 14c of the inner member 14. The quality of the material of which the outer member 15 is made and its thickness is such as to give it limited stiffness without unduly affecting its flexibility, whereby the walls 14a, 14c, of the inner member will be reinforced and made capable of resisting distortion as well as breakdown while a brewing operation is taking place. The thickness of the wall of the outer member will depend upon the quality and character of the material of which it is made. The bottom and side of the outer member are formed with elongated openings 15a, each extending approximately from the inner circumferential edge of the bottom 14a radially thereof and vertically with respect to the outer side wall 14c. The outer member 15 is preferably formed from an elongated section of suitable paper stock having a width equal to the width of the bottom wall 14a measured radially of the inner member 14 plus the heighth of the latter's outer side wall 14c and a length slightly in excess of the circumference of the side wall 14c, whereby the opposite end portions of paper section may be stapled, as shown at 16 in Fig. 3. Before the end portions of the paper sections are stapled, the elongated openings 15a are cut in the section leading inwardly from one edge and terminating at points 16a adjacent its opposite edge. The openings are preferably V-shaped providing between them reinforcing walls 15b, 15c, which are engaged with the bottom wall 14a and side wall 14c, respectively. To maintain the walls 15b in position, their inner end portions are suitably connected to an annular disk 17 (formed of cellulose material), preferably by means of staples 17a. It will be observed from Fig. 4, in cutting the paper section 15 that the inner overlapped end portion thereof has a length substantially equal to that of the side wall 14c. In this arrangement, one wall 15c only will extend inwardly from the overlapped portions of the member 15.

It will be observed that the members 14 and 15 are separately fabricated and then associated in nested relation. The members 14, 15, have a predetermined size, respectively, so that when they are assembled, (a) the inner member retains its shape and the reinforcing walls 15b, 15c, have close engagement with the bottom wall 14a and side wall 14c of the inner member, respectively, and (b) the openings 15a between the walls 15b, 15c, provide for flow of the water or liquid through the walls of the inner member 14. If desired, the inner and outer members 14, 15, may be connected together in a suitable manner, as by one or more staples. However, when the holder is used the paper forming the inner member 14 will become saturated with the liquid and cause the paper to adhere to the walls 15b, 15c; also, those portions lying between the walls 15b, 15c, will become slightly distorted and engage the side edges of the openings 15a, so that the two members will be in connected relation and can be removed as a unit, as later set forth. The holders 12 may be nested together in stacks and stored in a suitable container ready for use.

In operation, with the riser 8 in position and a holder 12 mounted on the support 10, a predetermined quantity of water is placed in the receptacle 1 and a proportionate amount of ground coffee is placed in the holder 12; the spreader 13, cover 5 and closure 6 are assembled as shown in Fig. 1 and the receptacle 1 is then placed over a source of heat, the effect of which is to initially heat the water in the bottom of the receptacle to set up convection currents in the water, whereby the water is caused to flow upwardly through the riser 8 into the closure 6 from which it gravitates to and through the spreader 13 for flow through the coffee in the holder 12 and the walls of the inner porous member, the heat being applied until the water is brought to, for example, the boiling point, whereby infusion of the soluble portion of the coffee with the water takes place. The circulation of the water may be continued for any desired period so as to increase the adsorption of or infusion of the soluble portion of the coffee with the water to make a strong beverage according to the taste of the drinker. At the end of the brewing operation and removal of the cover 5, closure 6 and spreader 13, the holder 12 is removed with the coffee residue therein and discarded in any desired manner. Such removal and discard of the holder and residue therein eliminates many objections, certain of which have herein been referred to. The remaining parts of the apparatus employed can be readily washed for re-use.

It will thus be observed that I provide a holder capable of taking the place of a conventional type of holder, but of economical construction so that the cost of using a new holder for each brewing operation is substantially negligible. Furthermore, in the use of a holder wherein the inner member is formed of porous material, a further advantage is obtained in that the brewed beverage does not contain any of the residue, thereby permitting the use of finely ground coffee.

Figs. 7 and 8 illustrate a modified form of construction wherein the holder, indicated as an entirety at 12', consists of inner and outer members 14', 15'. In this form of construction the inner member 14' is formed of thin porous paper similar to the member 14 already described. The outer member 15' comprises a frame form of wire and consisting of the following: 18 indicates a ring. 19 indicates a plurality of reinforcing members uniformly spaced about the axis of the ring 18 and soldered or welded at their outer ends thereto. Each member 19 extends downwardly from the ring 18, as shown at 19x, and radially inwardly, as shown at 19x'. The inner end of one member (member 19') is extended and bent into a coil which is slidably mounted on the riser 8, the lower convolution of the coil having engagement with the shoulder 9 to support the frame 15' in position. The inner ends of the remaining members 19 are soldered or welded to the lower convolution of the coil. As shown, when a porous inner member 14' is positioned in the frame 15', its bottom wall and outer side wall engage the sections 19x', 19x, respectively, of the frame members 19 to reinforce these walls and support the inner member in position. Due to the fact that the outer member 15' is of skeleton formation, it will be observed that at the end of the brewing operation, the outer side wall of the inner member 14' is freely accessible so that it may be folded inwardly over the residue in the member and the latter then removed and discarded in any suitable manner.

Fig. 9 illustrates a further modification wherein the holder indicated as an entirety at 12x comprises a single member formed of suitable paper and of annular shape, removably supported on the member 10. The holder 12x consists of an inner side wall 20, a bottom wall 20a and an outer side wall 20b, these walls being suitably connected in a well known manner and the walls 20a and 20b, being formed with relatively small perforations. In this form of holder, the walls thereof are formed of paper of sufficient strength or stiffness to resist distortion or destruction incident to the circulation of the heated liquid in carrying out a brewing operation so that an outer or reinforcing member is not required. However, due to the economical cost of the holder 12x, it may be used once for brewing coffee and then discarded.

From the foregoing description it will be noted that I provide a holder for a brewing substance which may be made of cheap material at low cost so that each holder can be used once and discarded, thereby saving labor and simplifying the removal of the coffee residue. As a new holder is employed for each brewing operation, danger of any bad flavor incident to a brewing operation being present in the beverage resulting from a succeeding brewing operation is materially reduced, since the parts to be used may be readily reconditioned.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A brewing apparatus having, in combination, a container for the liquid to be brewed, open at its upper end, closure means for said container, a riser for the liquid removably supported on the bottom of said container and extending upwardly therefrom for discharging the liquid, when the latter is circulated, into the space within said closure means, said closure means being shaped to form a receiver for the liquid and direct it downwardly, supporting means provided exteriorly of and intermediate the ends of said riser, a holder for the brewing substance surrounding said riser and removably mounted on said supporting means and consisting of an inner member formed of porous cellulose material and shaped to form a bottom wall and inner and outer side walls through which the liquid gravitates and an outer member formed of cellulose material having a continuous marginal portion disposed adjacent the open end of said inner member and uniformly spaced portions depending therefrom and arranged to engage the side and bottom walls, respectively, of said inner member, an annular disk disposed in overlapping relation to the terminating ends of said portions, and means for securing said disk and terminating ends together.

2. An apparatus as claimed in claim 1 wherein said outer member comprises a section of cellulose material consisting of a continuous marginal portion surrounding the outer side wall of said inner member and uniformly spaced portions extending downwardly and inwardly and arranged to engage the side wall and bottom wall, respectively, of said inner member, devices for connecting the opposite ends of said marginal portion together, and separate devices for connecting the outer ends of said spaced portions together, the side and bottom walls of said inner member, devices for connecting the opposite ends of said marginal portion together, and separate devices for connecting the outer ends of said extensions together.

3. An apparatus as claimed in claim 1 wherein said outer member comprises a section of flexible cellulose material consisting of a relatively narrow continuous marginal portion surrounding the outer side wall of said inner member adjacent its open end and uniformly spaced portions extending downwardly therefrom and radially inwardly in engagement with the side wall and bottom wall, respectively, of said inner member, devices for connecting the opposite ends of said marginal portion together, and separate devices for connecting the outer ends of said spaced portions together.

WILLIAM B. WIER.

REFERENCES CITED

The following references are of record in the file of this patent:

UNITED STATES PATENTS

| Number | Name | Date |
| --- | --- | --- |
| 494,206 | Jones | Mar. 28, 1893 |
| 1,297,425 | Wentorf | Mar. 18, 1919 |
| 1,412,388 | Clermont | Apr. 11, 1922 |
| 1,454,739 | Holland | May 8, 1923 |
| 1,876,474 | Starkey | Sept. 6, 1932 |
| 2,109,624 | Ramstedt | Mar. 1, 1938 |
| 2,150,588 | Pitt | Mar. 14, 1939 |
| 2,224,409 | Schleyer | Dec. 10, 1940 |
| 2,273,422 | Schroeder | Feb, 17, 1942 |
| 2,360,570 | Mattoon | Oct. 17, 1944 |

FOREIGN PATENTS

| Number | Country | Date |
| --- | --- | --- |
| 812,235 | France | May 3, 1937 |